United States Patent [19]

Heyland

[11] 4,317,467
[45] Mar. 2, 1982

[54] TWO-WAY PRESSURE RELIEF VALVE

[75] Inventor: James H. Heyland, Schaumburg, Ill.

[73] Assignee: Illinois Tool Works Inc., Chicago, Ill.

[21] Appl. No.: 167,302

[22] Filed: Jul. 10, 1980

[51] Int. Cl.³ ............................................. F16K 17/196
[52] U.S. Cl. .................... 137/493; 137/493.7;
137/508; 137/538; 251/368
[58] Field of Search ............................. 137/493–493.7,
137/493.9, 538, 516.27, 539, 508; 220/203

[56] References Cited

U.S. PATENT DOCUMENTS

| | | | |
|---|---|---|---|
| 2,986,159 | 5/1961 | Snyder | 137/493 |
| 3,067,770 | 12/1962 | Fancher | 137/493 |
| 3,375,844 | 4/1968 | Mercier et al. | 137/516.27 X |
| 3,894,556 | 7/1975 | Pareja | 137/539 |
| 3,983,894 | 10/1976 | Sheppard | 137/493 X |
| 4,167,952 | 9/1979 | Reinicke | 137/493 |

FOREIGN PATENT DOCUMENTS 910903 11/1962 United Kingdom ................. 137/493

Primary Examiner—Robert G. Nilson

Attorney, Agent, or Firm—Jerold M. Forsberg; T. W. Buckman; Jack R. Halvorsen

[57] ABSTRACT

There is disclosed a two-way valve which includes a single valve seat for controlling the flow of fluid in opposed directions through the valve responsive to differential fluid pressures across the valve. The valve includes first and second ports and a valve chamber. Across the valve chamber there is disposed a resilient diaphragm having an opening defining the valve seat. A ball valve element is supported in aligned relation to the valve seat and biasing means urge the ball element and valve seat into sealing engagement. When the pressure at the first port is greater than the pressure at the second port by a predetermined amount, the ball element moves away from the valve seat permitting fluid flow from the first port to the second port. When the pressure at the second port is greater than the pressure at the first port by a predetermined amount, the valve seat moves away from the ball element permitting fluid flow from the second port to the first port. Because the valve seat provides control for flow in both directions, the diaphragm opening conducts fluid in both directions through the valve.

8 Claims, 3 Drawing Figures

TWO-WAY PRESSURE RELIEF VALVE

BACKGROUND OF THE INVENTION

The present invention is generally directed to a new and improved two-way pressure relief valve and more particularly to such a valve having a single valve seat for controlling fluid flow in opposed directions through the valve.

There are many environments wherein pressure relief valves are required for substantially equalizing the pressure between an enclosed chamber relative to ambient atmospheric pressure. One such environment is in the fuel tank of an automobile or the like. In this application it is necessary to avoid the formation of a vacuum or pressure buildup in the fuel tank with respect to ambient pressure to preclude deformation of the tank. Any such deformation of a fuel tank is of course undesirable because it promotes the creation of faults in the tank which can lead to fuel leakage and the resulting danger of fire. In some cases, fuel tanks have been known to implode or explode due to the extreme pressure differentials between the inside of the tank and the outside ambient pressure.

Two-way pressure relief valves provide one solution to the foregoing problems. When the pressure within the tank decreases to the point of forming a partial vacuum, external air may be admitted to the tank to equalize the pressure. In the event of pressure buildup within the tank, air within the tank may be exhausted to the outside atmosphere to once again equalize the pressure.

Pressure relief valves for such an application must, of course, be reliable in view of the severe consequences which may result due to valve failure. Hence, such valves must be able to function properly over wide temperature extremes and for an indefinite period of time. While prior art valves have generally provided satisfactory results, there remains substantial room for improvement.

Prior valves have been relatively complex, requiring tight dimensional tolerances, and incorporating many individual component parts. This not only renders the valves expensive and difficult to manufacture, but additionally increases the possibility of component failure. Furthermore, such prior valves have been rather difficult to adjust, have included a plurality of valve seats, and have been subject to wear.

It is, therefore, an object of the present invention to provide a new and improved two-way pressure relief valve.

It is a further object to provide such a two-way pressure relief valve which includes very few component parts.

It is a further object of the present invention to provide such a valve which is simple to adjust and which includes a single valve seat.

SUMMARY OF THE INVENTION

The present invention provides a two-way valve permitting fluid flow in opposed directions in response to differential fluid pressures across the valve. The valve includes a housing having first and second ports, valve seat means having a valve seat surface and valve element means arranged to coact with the valve seat surface for opening and closing the valve. The valve element means is moveable away from the valve seat surface for permitting fluid flow in a first path from the first port to the second port when the fluid pressure at the first port is greater than the fluid pressure at the second port, and the valve seat surface is moveable away from the valve element means for permitting fluid flow in a second path from the second port to the first port when the fluid pressure at the second port is greater than the fluid pressure at the first port. The valve seat surface is operative for controlling fluid flow in both the opposed directions and defines an opening forming a portion of both the first and second fluid flow paths.

BRIEF DESCRIPTION OF THE DRAWINGS

The features of the present invention which are believed to be novel are set forth with particularity in the appended claims. The invention, together with the further objects and advantages thereof, may best be understood by making reference to the following description taken in conjunction with the accompanying drawings, in the several figures of which like reference numerals identify identical elements, and wherein:

DESCRIPTION OF THE PREFERRED EMBODIMENT

Figure 1:
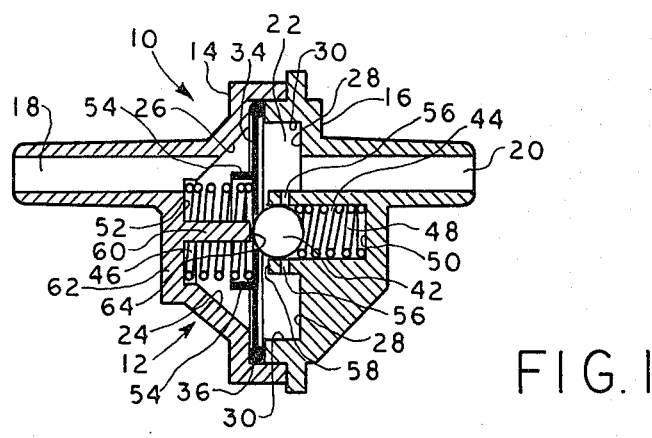
FIG. 1 is a cross-sectional view of a two-way pressure relief valve embodying the present invention.

Referring now to FIG. 1, the two-way pressure relief valve 10 there illustrated in cross section which embodies the present invention generally includes a housing 12 comprising a pair of interlocking housing portions 14 and 16. The housing portions 14 and 16 are arranged to interfit together and define a first port 18 and a second port 20. Between the first port 18 and the second port 20, the housing 12 defines a valve chamber 22. The two-way pressure relief valve 10 of FIG. 1 may be utilized, for example, in a gas cap or the like for an automobile with the first port 18 being in fluid communication with the interior of the fuel tank of the automobile and the second port 20 being in fluid communication with ambient atmospheric pressure. However, as will be appreciated by those skilled in the art, the valve 10 may be utilized in virtually any environment wherein pressure relief is required. It should therefore be understood that the present invention is not limited to relief valves for use in automobiles or the like, but to the contrary, may be utilized to advantage in any environment wherein pressure relief is required.

The valve chamber 22 within the housing 12 is generally defined by a pair of converging wall segments 24 and 26 of housing portion 14, and by an annular inner surface 28 of housing portion 16 together with cylindrical surface portions 30. Disposed across the valve chamber 22 is a resilient diaphragm member 34 which forms a valve seat means of the valve. The peripheral margin of the diaphragm has a generally circular cross section forming an integral O-ring 36 to permit mounting of the diaphragm within the housing in fluid tight sealed relation.

Figure 2:
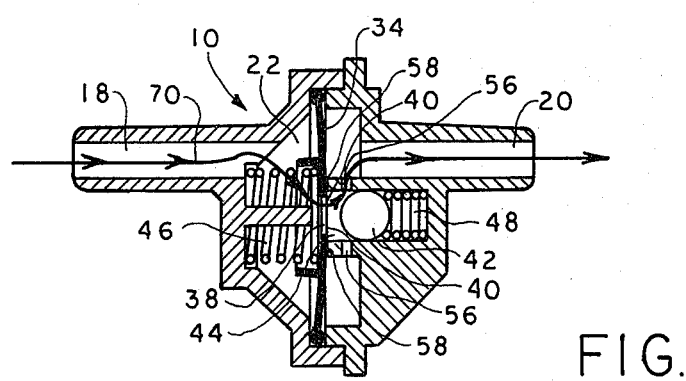
FIG. 2 is a cross-sectional view of the valve of FIG. 1 illustrating its operation during a first mode of operation.

The diaphragm 34 includes an opening 38 as best seen in FIG. 2 having a peripheral surface 40 defining the valve seat surface of the diaphragm 34. Preferably, the diaphragm is formed from a resilient elastomeric material such as fluorinated hydrocarbon.

Also within the valve chamber 22 there is disposed a valve element means in the form of a ball-shaped valve element 42. The ball element 42 is supported within the chamber 22 in aligned relation to the valve seat surface 40 of the diaphragm 34. To that end, the housing portion 16 includes a second chamber 44 arranged to receive and support the ball element 42 therein in its aligned relation to the diaphragm 34. The diameter of the chamber 44 is substantially equal to the diameter of the ball element 42.

The ball element 42 and valve seat surface 40 of the diaphragm 34 are urged together into fluid tight sealing engagement by biasing means comprising a first coil spring 46 which acts upon the diaphragm 34 and a second coil spring 48 which acts upon the ball element 42. The coil spring 48 is disposed within the chamber 44 between the ball element 42 and an end wall 50.

The first coil spring 46 is disposed between the diaphragm 34 and an annular end wall 52 of housing portion 14. The diaphragm 34 includes an annular ring extension or flange 54 which serves to accurately position the coil spring 52 with respect to the valve seat surface 40 of the diaphragm.

The second chamber 44 is in fluid communication with the valve chamber 22 and the second port 20 by a pair of aligned through bores 56. As will be explained subsequently, the through bores 56 form a portion of a first fluid flow path when the valve 10 relieves a positive pressure buildup at the first port 18.

Also within the valve chamber 22 the housing 12 defines stop means for both the diaphragm 34 and the ball element 42. To that end, the housing 12 defines a first stop means 58 which is formed by the end surface of the second chamber 44. The second stop means comprises a projection 60 which extends from a wall 62 of housing portion 14 through the coil spring 46 and terminates at an end surface 64 approximate to the ball element 42.

Referring now to FIG. 2, it illustrates a first mode of operation of the valve 10 for relieving positive pressure buildup at the first port 18. When the pressure at the first port 18 is greater than the ambient pressure at the second port 20 by a predetermined amount, the ball element 42 moves away from the diaphragm 34 and the valve seat surface 40 as illustrated. When the ball element 42 moves away from the valve seat surface 40 by an amount sufficient to unblock the bore 56, a first fluid flow path is established through the valve. The first fluid flow path is indicated by the arrows 70 for permitting fluid flow from the first port 18, into the valve chamber 22, through the opening 38 of diaphragm 34, into the second chamber 44, through the bores 56, and out the second port 20. In operating in this mode, the valve 10 relieves pressure buildup at the first port 18 and thus relieves pressure buildup within the fuel tank of an automobile, for example.

It can be noted from FIG. 2 that the diaphragm 34 engages the end surface 58 of the annular end wall of the second chamber 44. This end surface 58 as a result provides a stop means for the diaphragm to preclude diaphragm movement in the direction of the ball element 42 when the ball element 42 moves away from the diaphragm 34 and its valve seat surface 40. The spring 48 may be chosen to have a spring load to a desired degree to establish the predetermined pressure differential which must exist between the first port 18 and second port 20 in order to cause the ball element 42 to move away from the valve seat surface 40 for equalizing the pressure between the valve ports.

As can also be appreciated from FIGS. 1 and 2, the pressure relief valve of the present invention provides seal integrity between the valve seat surface 40 and the ball element 42 until the ball element 42 moves away from the valve seat surface. More specifically, because the diameter of the opening 38 is of lesser dimension than the diameter of the second chamber 44, a small amount of diaphragm material will act against the ball 42 under the influence of the positive pressure at the first port 18 to cause the seal between the ball and diaphragm to remain intact. That seal remains intact with complete integrity until the ball element 42 moves as described above.

Figure 3:
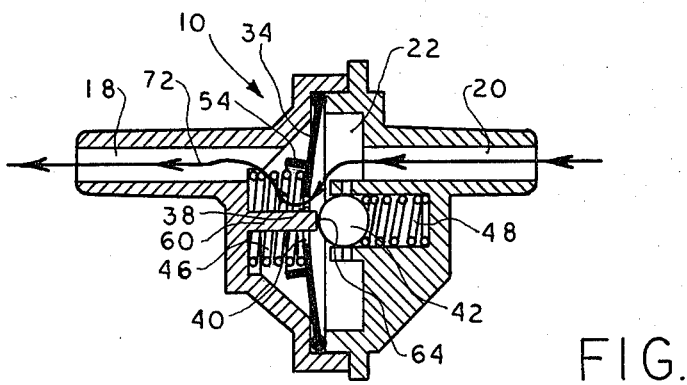
FIG. 3 is another cross-sectional view of the valve of FIG. 1 illustrating the operation of the valve of FIG. 1 during a second mode of operation.

Referring now to FIG. 3, here the valve 10 is illustrated for its second mode of operation. In this mode of operation, the valve 10 is relieving a vacuum which has formed at the first port 18 to once again substantially equalize the pressure differential between the first port 18 and second port 20. When the pressure at the first port 18 falls below the pressure at the second port 20 by a predetermined amount, the greater pressure at the second port 20 will cause the diaphragm 34 and its valve seat surface 40 to move away from the ball element 42. The amount of pressure differential required to cause the diaphragm 34 to so move is adjustable by the particular spring load chosen for the spring 46. When the valve seat surface 40 is displaced from the ball element 42, the valve 10 establishes a second fluid flow path indicated by arrows 72 from the second port 20 to the first port 18. This second fluid flow path permits fluid flow from the second port 20, into the valve chamber 22, through the opening 38 within the diaphragm 34, and out the first port 18. The flow of fluid, such as air, then enters the fuel tank of an automobile, for example, to relieve the vacuum therein.

It will also be noted in FIG. 3 that the annular flange 54 of the diaphragm 34 maintains the spring 46 in proper alignment to the valve seat surface 40 at all times. It will also be noted that the projection 60 which forms the stop means for the ball element 42 precludes the ball element 42 from moving in the direction of the diaphragm when the diaphragm moves away from the ball element 42.

After the pressure differential between the first port 18 and second port 20 is substantially equalized, the diaphragm 34 and ball element 42 will return to their respective positions as illustrated in FIG. 1. Now, the valve is ready to respond once again to differential pressures across the valve as may be necessary.

In practice, the housing portions 14 and 16 of the housing 12 may be formed from a plastic nylon material. The ball element 42 may be formed from glass, for example, and the springs 48 and 46 may be formed from tinned music wire. Each of these materials, along with the material of the diaphragm 34 is low in weight to thereby provide a valve 10 which is light in weight and resistant to material degradation.

As may also be appreciated from the foregoing, because the opening 38 of diaphragm 34 is common to both the first and second fluid flow paths, the valve seat surface 40 is operative for controlling fluid flow in both modes of operation. This is particularly important due to the fact that the number of components in the valve is substantially reduced which decreases the likelihood of component failure. Also, accurate adjustment of the vacuum opening and positive pressure opening is achieved by simply selecting springs 46 and 48 having the proper spring load. Once such springs are selected, further adjustment is unnecessary.

Lastly, mechanical operation of the valve is simple and responsive. No tight dimensional tolerances between the moving parts are required which results in assembly ease and production cost savings. Furthermore, because the valve of the present invention has relatively few moving parts, the valve of the present invention provides consistent dependability and resistance to wear or failure.

While a particular embodiment of the present invention has been shown and described, modifications may be made, and it is therefore intended to cover in the appended claims all such changes and modifications which fall within the true spirit and scope of the invention.

I claim:

1. A two-way valve comprising: a two-piece plastic housing having a first port, a second port, and a valve chamber communicating between said ports; a resilient elastomeric diaphragm extending across said chamber and sealed by said housing, said diaphragm including a centrally disposed aperture having an inner surface portion forming a valve seat; a ball-shaped element supported within said chamber in aligned relation to said valve seat, said housing having a second chamber for receiving and supporting said ball element in aligned relation to said valve seat; and biasing means for urging said ball element and said valve seat into sealing engagement, said ball element being moveable away from said valve seat responsive to a fluid pressure at said first port which is greater than the fluid pressure at said second port by a predetermined amount for establishing a first fluid flow path from said first port, through said diaphragm aperture, and to said second port, and said diaphragm being moveable away from said ball element for displacing said valve seat therefrom responsive to a fluid pressure at said second port which is greater than the fluid pressure at said first port by a predetermined amount for establishing a second fluid flow path from said second port, through said diaphragm aperture, and to said first port.

2. A valve as defined in claim 1, further including a bore between said valve chamber and said second chamber, said bore being normally blocked by said ball element and arranged to provide fluid communication between said chambers when said ball element moves away from said valve seat to permit fluid flow from said diaphragm aperture to said second port.

3. A valve as defined in claim 2, wherein said housing includes stop means for restraining movement of said ball element toward said valve seat when said diaphragm moves away from said ball element.

4. A valve as defined in claim 1, wherein said housing includes stop means for restraining movement of said diaphragm towards said ball element when said ball element moves away from said valve seat.

5. A valve as defined in claim 1, wherein said biasing means comprises a coil spring within said second chamber for urging said ball element against said valve seat.

6. A valve as defined in claim 5, wherein said biasing means further includes a second coil spring within said valve chamber for urging said diaphragm against said ball element.

7. A valve as defined in claim 1 wherein said diaphragm includes an integral O-ring about its periphery which seals against said housing.

8. A valve as defined in claim 7 wherein said housing includes means for clamping said O-ring between the two pieces forming said housing when assembled in final relationship.

* * * * *